US009478837B2

(12) United States Patent
Amine et al.

(10) Patent No.: US 9,478,837 B2
(45) Date of Patent: Oct. 25, 2016

(54) LITHIUM AIR BATTERIES HAVING ETHER-BASED ELECTROLYTES

(71) Applicant: UCHICAGO ARGONNE, LLC, Chicago, IL (US)

(72) Inventors: Khalil Amine, Oakbrook, IL (US); Larry A. Curtiss, Downers Grove, IL (US); Jun Lu, Bolingbrook, IL (US); Kah Chun Lau, Darien, IL (US); Zhengcheng Zhang, Naperville, IL (US); Yang-Kook Sun, Seoul (KR)

(73) Assignee: UCHICAGO ARGONNE, LLC, Chicago, IL (US)

( * ) Notice: Subject to any disclaimer, the term of this patent is extended or adjusted under 35 U.S.C. 154(b) by 70 days.

(21) Appl. No.: 14/633,408

(22) Filed: Feb. 27, 2015

(65) Prior Publication Data
US 2015/0171496 A1 Jun. 18, 2015

Related U.S. Application Data

(62) Division of application No. 13/411,841, filed on Mar. 5, 2012, now Pat. No. 8,968,941.

(51) Int. Cl.
H01M 12/08 (2006.01)
H01M 2/16 (2006.01)
H01M 4/40 (2006.01)
H01M 4/96 (2006.01)
B82Y 30/00 (2011.01)

(52) U.S. Cl.
CPC ............ *H01M 12/08* (2013.01); *H01M 2/162* (2013.01); *H01M 2/1626* (2013.01); *H01M 4/405* (2013.01); *H01M 4/96* (2013.01); *B82Y 30/00* (2013.01); *H01M 2300/0025* (2013.01); *H01M 2300/0028* (2013.01); *Y02E 60/50* (2013.01)

(58) Field of Classification Search
CPC .. H01M 12/08; H01M 2/162; H01M 2/1626; H01M 4/96; H01M 4/405; H01M 2300/0028; H01M 2300/0025; B82Y 30/00; Y02E 60/50
See application file for complete search history.

(56) References Cited

U.S. PATENT DOCUMENTS

2010/0227220 A1   9/2010   Thackeray et al.
2013/0071761 A1   3/2013   Amine et al.

OTHER PUBLICATIONS

Girishkumar et al. Journal of Physical Chemistry Letters 2010 vol. 1 pp. 2193-2203.*
Radlin et al. Journal of the American Chemical Society, published Dec. 8, 2011, vol. 134 pp. 1093-1103.*
U.S. Appl. No. 61/472,282, filed Apr. 6, 2011, Amine et al.
Abraham, et al., "A Polymer Electrolyte-Based Rechargeable Lithium/Oxygen Battery", Electrochem. Soc. 143, 1-5, (1996).
Albertus, et al., "Identifying Capacity Limitations in the Li/Oxygen Battery Using Experiments and Modeling", J. Electrochem. Soc. 158, A343-A351 (2011).
Assary, et al., "Computational Studies of Polysiloxanes: Oxidation Potentials and Decomposition Reactions", The Journal of Physical Chemistry C, 115, 12216-12223 (2011).

(Continued)

*Primary Examiner* — Patrick Ryan
*Assistant Examiner* — Aaron Greso
(74) *Attorney, Agent, or Firm* — Foley & Lardner LLP (57) ABSTRACT

A lithium-air battery includes a cathode including a porous active carbon material, a separator, an anode including lithium, and an electrolyte including a lithium salt and polyalkylene glycol ether, where the porous active carbon material is free of a metal-based catalyst.

15 Claims, 5 Drawing Sheets

(56) References Cited

OTHER PUBLICATIONS

Blöchl, P.E., "Projector augmented-wave method", Phys. Rev. B, 50, (24), 17953, (1994), 27 pages.
Carlsson, et al., "Two-Step Mechanism for Low-Temperature Oxidation of Vacancies in Graphene", Physical Review Letters, 102, 166104, (2009), 4 pages.
Chen, et al., "The role of transition metal interfaces on the electronic transport in lithium-air batteries", Catalysis Today, 165, 2-9, (2011).
Cui, et al., "A free-standing-type design for cathodes of rechargeable Li—O2 batteries", Energy Environ. Sci., 4, 4727-4734, (2011).
Curtiss, et al., "Gaussian-4 theory using reduced order perturbation theory", Journal of Chemical Physics ,127, 124105 (2007), 9 pages.
Curtiss, et al., "Gaussian-4 theory", Journal of Chemical Physics, 126, 084108 (2007), 13 pages.
Enkovaara, et al., "Electronic structure calculations with GPAW: a real-space implementation of the projector augmented-wave method", Journal of Physics Condensed Matter 22, 253202, (2010), pp. 1-24.
Freunberger, et al., "Reactions in the Rechargeable Lithium—O2 Battery with Alkyl Carbonate Electrolytes", J. Am. Chem. Soc. 133, 8040-8047, (2011).
Freunberger, et al., "The Lithium—Oxygen Battery with Ether-based Electrolytes", Angew. Chem. Int. Ed. 50, 8609-8613, (2011).
Garcia-Lastra, et al., "Communication: Strong excitonic and vibronic effects determine the optical properties of Li2O2", J. Chem. Phys. 135, 121101, (2011), 5 pages.
Giordani, et al., "H2O2 Decomposition Reaction as Selecting Tool for Catalysts in Li—O2 Cells", Electrochem. Solid-State Lett. 13, (12), A180-A183, (2010).
Girishkumar et al., "Lithium-Air Battery: Promise and Challenges," J Phys. Chem. Lett. 1, 2193-2203 (2010).
Hassoun, et al., "Investigation of the O2 Electrochemistry in a Polymer Electrolyte Solid-State Cell", Angew. Chem. Int. Ed. 50, 2999-3002, (2011).
Hummelshøj, et al., "Communications: Elementary oxygen electrode reactions in the aprotic Li-air battery", J. Chem. Phys., 132, 071101, (2011), 5 pages.
Kresse, et al., "Efficiency of ab-initio total energy calculations for metals and semiconductors using a plane-wave basis set", Comput. Mat. Sci., 6, 15-50, (1996).
Kresse, et al., "Efficient iterative schemes for ab initio total-energy calculations using a plane-wave basis set", Phys. Rev. B54, 11169-11186, (1996). Abstract only.
Kresse, et al., "From ultrasoft pseudopotentials to the projector augmented-wave method", Phys. Rev. B, 59, (3), 1758-1775, (1999).
Laoire, et al., "Rechargeable Lithium/TEGDME-LiPF6/O2 Battery", Journal of the Electrochemical Society, 158, (3), A302-A308, (2011).
Lau, et al., "Density Functional Investigation of the Thermodynamic Stability of Lithium Oxide Bulk Crystalline Structures as a Function of Oxygen Pressure", The Journal of Physical Chemistry C, 115, 23625-23633, (2011).
Lee, et al., "Defect-Induced Oxidation of Graphite", Physical Review Letters, 82, (1), 217-220, (1999).
Lindsay, et al., "ESR Spectra of Matrix-Isolated LIO2", J. Phys. Chem, 91, 6158-6161, (1987).
Lu, et al., "Platinum-Gold Nanoparticles: A Highly Active Bifunctional Electrocatalyst for Rechargeable Lithium-Air Batteries", J. Am. Chem. Soc., 132, 12170-12171, (2010).

Marenich, et al., "Universal Solvation Model Based on Solute Electron Density and on a Continuum Model of the Solvent Defined by the Bulk Dielectric Constant and Atomic Surface Tensions", The Journal of Physical Chemistry B, 113, 6378-6396, (2009).
McCloskey, et al., "Solvents' Critical Role in Nonaqueous Lithium—Oxygen Battery Electrochemistry", J. Phys. Chem. Lett., 2, 1161-1166, (2011).
Mitchell, et al., "All-carbon-nanofiber electrodes for high-energy rechargeable Li—O2 batteries", Energy Environ. Sci. 4, 2952-2958, (2011).
Mizuno, et al., "Rechargeable Li-Air Batteries with Carbonate-Based Liquid Electrolytes", Electrochem. 78, (5), 403-405, (2010).
Mortensen, et al., "Real-space grid implementation of the projector augmented wave method", Physical Review B, 71, 035109, (2005), 11 pages.
Ogasawara, et al., "Rechargeable Li2O2 Electrode for Lithium Batteries", J. Am. Chem Soc., 128, 1390-1393, (2006).
Ortmann, et al., "Attracted by Long-Range Electron Correlation: Adenine on Graphite", Physical Review Letters, 95, 186101, (2005), 5 pages.
Perdew, et al., "Accurate and simple analytic representation of the electron-gas correlation energy", Physical Review B, 45, (23), 13244-13249, (1992).
Perdew, et al., "Generalized Gradient Approximation Made Simple", Phys. Rev. Lett., 77, (18), 3865-3868, (1996).
Radin et al., "Lithium Peroxide Surfaces Are Metallic, While Lithium Oxide Surfaces Are Not", J. American Chem. Society, 134, 1093-1103 (Dec. 8, 2011).
Read, J., "Ether-Based Electrolytes for the Lithium/Oxygen Organic Electrolyte Battery", Journal of the Electrochemical Society, 153, (1), A96-A100, (2006).
Seriani, N., "Ab initio thermodynamics of lithium oxides: from bulk phases to nanoparticles", Nanotechnology, 20, 445703, (2009), 7 pages.
Smith, et al., "DL_POLY_2.0: A general-purpose parallel molecular dynamics simulation package", Journal of Molecular Graphics 14, 3,(Jun. 1996). Abstract only.
Son, et al., "Energy Gaps in Graphene Nanoribbons", Physical Review Letters, 97, 216803, (2006), 4 pages.
Suntivich, et al., "Design principles for oxygen-reduction activity on perovskite oxide catalysts for fuel cells and metal-air batteries", Nature Chemistry, 3, 546-550, (Jul. 2011).
Todorov, et al., "DL_POLY_3: new dimensions in molecular dynamics simulations via massive parallelism", J. Mater. Chem., 16, 1911-1918, (2006).
Trahey, et al., "Activated Lithium-Metal-Oxides as Catalytic Electrodes for Li—O2 Cells", Electrochemical and Solid-State Letters, 14, (5), A64-A66, (2011).
Notice of Allowance in U.S. Appl. No. 13/411,841 dtd Oct. 22, 2014 (16 pages).
Vegge, Tejs, "Identifying the rate-limiting processes at the Li-air cathode", Presentation to Topsøe Catalysis Forum 2011, Aug. 26, 2011, 25 pages.
Yoo, et al., "Li-Air Rechargeable Battery Based on Metal-free Graphene Nanosheet Catalysts," ACS Nano, vol. 5, No. 4, 3020-3026, (2011).
Zhang, et al., "Highly conductive trimethylsilyl oligo(ethylene oxide) electrolytes for energy storage applications", J. Mater. Chem., 18, 3713-3717, (2008).
Zhang, et al., "Increased Stability Toward Oxygen Reduction Products for Lithium-Air Batteries with Oligoether-Functionalized Silane Electrolytes", J. Phys. Chem. C, 115, 25535-25542, (2011).

* cited by examiner

LITHIUM AIR BATTERIES HAVING ETHER-BASED ELECTROLYTES

CROSS-REFERENCE TO RELATED APPLICATIONS

This application is a divisional application of U.S. application Ser. No. 13/411,841, filed Mar. 5, 2012, which is incorporated herein by reference in its entirety for any and all purposes.

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to rechargeable batteries. More specifically it is related to lithium-air batteries having ether-based electrolytes.

BACKGROUND

Non-aqueous Li-air batteries have a high theoretical gravimetric energy density compared to conventional Li-ion batteries, and thus have the potential for making long-range electric vehicles a reality. Reversible non-aqueous Li-air batteries use a lithium metal anode, a liquid organic electrolyte, and a carbon-supported metal-based catalyst air cathode. Li-air cells differ from conventional battery systems such as lead-acid, nickel-metal hydride, and lithium-ion systems, because oxygen is supplied as a fuel to the cell during discharge. In this case, the lithium anode releases an electron to the external circuit producing lithium ions in the electrolyte, whereas the oxygen is reduced at a cathode surface to form lithium peroxide ($Li_2O_2$) or, possibly, lithium oxide ($Li_2O$) products.

Two major problems that have limited the successful development of Li-air batteries. First, there are difficulties in attaining full reversibility, which therefore limits cyclability of the battery. Second, low charge overpotentials limit the electrical energy efficiency of the battery.

SUMMARY

In one aspect, a discharged lithium-air battery is provided including a cathode that includes a porous active carbon material, a separator, an anode including lithium, an electrolyte, and a lithium peroxide exhibiting a nanostructured morphology and having a superoxide surface structure. In one embodiment, the lithium peroxide exhibits a nanostructured morphology comprises nanoparticles having an average diameter of from 1 to 200 nm. In another embodiment, the lithium peroxide exhibits a nanostructured morphology including nanoparticles having an average diameter of from 1 to 100 nm. In another embodiment, the lithium peroxide exhibits a nanostructured morphology including nanoparticles having an average diameter of from 1 to 70 nm. In any of the above embodiments, the lithium peroxide having a superoxide surface structure includes lithium peroxide including an oxygen-rich surface. In any of the above embodiments, the electrolyte includes an ether-based solvent and a lithium salt. In any of the above embodiments, the electrolyte includes a compound which favors a form of lithium peroxide with a low charge overpotential. As defined herein, a low charge overpotential is one which is 0.5 V or less. In some embodiments, this may include where the overpotential is 0.4 V or less, 0.3 V or less, 0.2 V or less, or 0.1 V or less.

In another aspect, a lithium-air battery includes a cathode including a porous active carbon material, a separator, an anode including lithium, and an electrolyte including a lithium salt and polyalkylene glycol ether, wherein the porous active carbon material is free of a metal-based catalyst. In some embodiments, the polyalkylene glycol ether is a compound represented by Formula I:

$$R^1O\{[(CR^2R^3)_xO]_z\}R^4 \quad (I)$$

where $R^1$ is alkyl, aryl, heterocyclyl, heteroaryl, or silyl; each occurrence of $R^2$ and $R^3$ is independently H, halo, alkyl, aryl, heterocyclyl, heteroaryl, silyl, or siloxyl; $R^4$ is alkyl, aryl, heterocyclyl, heteroaryl, or silyl; x is 1, 2, 3, 4, 5, or 6; and z is 2, 3, 4, 5, 6, 7, or 8. In any of the above embodiments, $R^1$ is alkyl, cycloalkyl, heterocyclyl, or silyl.

In any of the above embodiments, each occurrence of $R^2$ and $R^3$ is individually H, F, Cl, or alkyl. In any of the above embodiments, $R^4$ is alkyl, cycloalkyl, heterocyclyl, or silyl. In any of the above embodiments, x is 1, 2, or 3. In any of the above embodiments, z is 2, 3, or 4. In any of the above embodiments, $R^1$ is $C_1$-$C_8$ alkyl, a 5- or 6-membered cycloalkyl, a 5- or 6-membered heterocyclyl, or a trialkylsilyl; each occurrence of $R^2$ and $R^3$ are individually H, F, Cl, or $C_1$-$C_6$ alkyl; $R^4$ is $C_1$-$C_8$ alkyl, a 5- or 6-membered cycloalkyl, a 5- or 6-membered heterocyclyl, or a trialkylsilyl; x is 2, or 3; and z is 2, 3, or 4. In any of the above embodiments, $R^1$ is methyl, ethyl, n-propyl, iso-propyl, n-butyl, iso-butyl, tert-butyl, trimethylsilyl, or triethylsilyl; each occurrence of $R^2$ and $R^3$ is H, F, Cl, methyl, or ethyl; $R^4$ is methyl, ethyl, n-propyl, iso-propyl, n-butyl, iso-butyl, tert-butyl, a cyclic carbonate, trimethylsilyl, or triethylsilyl; x is 2, or 3; and z is 2, 3, or 4.

In one embodiment, the compound represented by Formula I is tetraethyleneglycoldimethylether, 2-[2-[2-[2-methoxy]ethoxy]ethoxy]ethoxy trimethyl silane (1NM3), or a mixture thereof. In any of the above embodiments, the lithium salt includes $LiCF_3SO_3$, lithium bis(trifluoromethane sulfonimide), $LiBF_4$, $LiPF_6$, $Li[B(C_2O_4)_2]$, $Li[B(C_2O_4)F_2]$, or $Li[PF_4(C_2O_4)]$. In any of the above embodiments, the lithium salt is $LiCF_3SO_3$.

In one embodiment, the porous active carbon material is free of a metal-based catalyst, the catalyst including Pt, Pd, Fe, Ti, Zr, Zn, Ag, Au, Ni, Co, Mn, Ce or La.

In one embodiment, the porous active carbon material includes microporous carbon, mesoporous carbon, mesoporous microbeads, graphite, expandable graphite, carbon black, or carbon nanotubes. In one embodiment, the porous active carbon material includes carbon black.

In one embodiment, the cathode also includes a binder.

In one embodiment, the cathode also includes a gas diffusion layer.

In one embodiment, the separator includes a paper, glass, or polymer separator.

In one embodiment, the anode includes a lithium metal foil.

BRIEF DESCRIPTION OF THE DRAWINGS

FIG. 1 is the voltage profile during repeated discharge-charge of cells based on (a) 1NM3-$LiCF_3SO_3$ electrolyte (b) TEGDME-$LiCF_3SO_3$ electrolyte; (c) comparison of first cycle discharge-charge for propylene carbonate(PC)-

$LiCF_3SO_3$, 1NM3-$LiCF_3SO_3$, TEGDME-$LiCF_3SO_3$. The profiles were obtained with a time-control of 5 hours for charge and discharge.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, borynl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, C=$CH_2$, or C=$CHCH_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

In one aspect, a lithium-air battery is provided, the battery exhibiting both reversibility and low charge overpotential. The battery includes an ether-based electrolyte and a cathode comprising a porous active carbon material. The porous active carbon material comprises a nanoparticulate carbon that is free of any metal catalysts. In some embodiments, the carbon cathode is free of metals other than lithium. The ether based-electrolyte includes substituted polyalkylene glycol ethers in combination with a lithium salt. The electrolytes are believed to promote nucleation and growth of nanocrystalline lithium peroxide at the cathode, but with a low charge potential that allows for batteries with a high electrical efficiency and repeated cycling.

As noted above, the lithium-air batteries having ether-based electrolytes are able to successfully achieve highly reversible formation and decomposition of lithium oxide products at a very low charge overpotential, without incorporation of metal-based catalysts into the cathode. The metal-based catalysts are materials that have previously been added to cathodic materials, such as various forms of carbon, to assist in decomposing precipitates of lithium oxides that form at the cathode upon operation of lithium-air batteries. In general, the previously required metal-based catalysts included the use of metals such as Pt, Pd, Fe, Ti, Zr, Zn, Ag, Au, Ni, Co, Mn, Ce or La. Illustrative examples of metal-based catalysts that were previously required include, but are not limited to, $Fe_3O_4$, $MnO_2$, Pt, Au, $Co_3O_4$, and $CeO_2$. However, the present batteries have been found to not require such catalysts, when the electrolyte is an ether-based electrolyte. Thus, in some embodiments, the porous active carbon cathode is free of metal-based catalysts. In other embodiments, the porous active carbon cathode is free of all metal species, except for lithium, which is required for battery operation.

As noted above, the ether based-electrolyte includes substituted polyalkylene glycol ethers in combination with a lithium salt. Suitable ether based solvents include polyalkylene glycol ethers having substituents that include, but are not limited to, silicon, fluorine, nitrogen, chlorine, phosphorus and aromatic groups. In general, polyalkylene glycol ethers include those as represented by Formula I:

$$R^1O\{[(CR^2R^3)_xO]_z\}R^4 \quad \quad (I)$$

In Formula I, $R^1$ may include alkyl, aryl, heterocyclyl, heteroaryl, siloxyl or silyl; each occurrence of $R^2$ and $R^3$ is independently H, halo, alkyl, aryl, heterocyclyl, heteroaryl, silyl, or siloxyl; $R^4$ is alkyl, aryl, heterocyclyl, heteroaryl, siloxyl or silyl; x is 1, 2, 3, 4, 5, or 6; and z is 2, 3, 4, 5, 6, 7, or 8. It should be expressly stated that not all glycol ethers are suitable.

In any of the above embodiments, $R^1$ is alkyl, cycloalkyl, heterocyclyl, or silyl. In any of the above embodiments, each occurrence of $R^2$ and $R^3$ are individually H, F, Cl, or alkyl. In any of the above embodiments, $R^4$ is alkyl, cycloalkyl, heterocyclyl, or silyl. In any of the above embodiments, x is 1, 2, or 3. In any of the above embodiments, z may be 2, 3, or 4. In one embodiment, $R^1$ is $C_1$-$C_8$ alkyl, a 5- or 6-membered cycloalkyl, a 5- or 6-membered heterocyclyl, or a trialkylsilyl; each occurrence of $R^2$ and $R^3$ are individually H, F, Cl, or $C_1$-$C_6$ alkyl, $R^4$ is $C_1$-$C_8$ alkyl, a 5- or 6-membered cycloalkyl, a 5- or 6-membered heterocyclyl, or a trialkylsilyl; x is 2, or 3; and z is 2, 3, or 4. In one embodiment, $R^1$ is methyl, ethyl, n-propyl, iso-propyl, n-butyl, iso-butyl, tert-butyl, trimethylsilyl, or triethylsilyl; each occurrence of $R^2$ and $R^3$ is H, F, Cl, methyl, or ethyl; $R^4$ is methyl, ethyl, n-propyl, iso-propyl, n-butyl, iso-butyl, tert-butyl, a cyclic carbonate, trimethylsilyl, or triethylsilyl; x is 2, or 3; and z is 2, 3, or 4.

Illustrative compounds of Formula I include, but are not limited to tetraethyleneglycoldimethylether (TEGDME), diglyme, triglyme, 2-[2-[2-[2-methoxy]ethoxy]ethoxy] ethoxy trimethyl silane (1NM3), $(CH_3)_3SiO(CH_2CH_2O)_n$ $CH_3$; $(CH_3)_3SiCH_2O(CH_2CH_2O)_nCH_3$; $CH_3O(CH_2CH_2 O)_nSi(CH_3)_2O(CH_3)_2SiO(CH_2CH_2O)_nCH_3$; and $CH_3O$ $(CH_2CH_2O)_2Si(CH_3)_2OSi(CH_3)_2O(CH_3)_2SiO(CH_2CH_2O)_2$ $CH_3$, where each n is independently 2-7.

Suitable lithium salts for use in the electrolyte include, but are not limited to, $LiCF_3SO_3$, lithium bis(trifluoromethane sulfonimide), $LiBF_4$, $LiPF_6$, $Li[B(C_2O_4)_2]$, $Li[B(C_2O_4)F_2]$, or $Li[PF_4(C_2O_4)]$. In one embodiment, the lithium salt is $LiCF_3SO_3$.

Based upon the examples which follow below, illustrative electrolytes include, but are not limited to, TEGDME-$LiCF_3SO_3$, 1NM3-$LiCF_3SO_3$, and TEGDME/1NM3-$LiCF_3SO_3$, where TEGDME/1NM3 represents a mixture of TEGDME and 1NM3.

The porous active carbon material may include any such carbon material that is known for use in lithium-air batteries. The material may include a high surface area carbon material and/or nanoparticulate carbon materials. For example, the high surface area carbon materials include, but are not limited to, microporous carbon, mesoporous carbon, mesoporous microbeads, graphite, expandable graphite, carbon black, or carbon nanotubes. Commercial examples of carbon black include, but are not limited to, Super P, Black Pearl 2000, Denka Black, Vulcan XC72R, Ketjen black.

The porous active carbon material may be sequestered with a binder to prevent migration of the material through the cell. For example, the porous active carbon material may be intimately mixed with a binder either by heating of the binder to a liquid state or in solution with a solvent. In the former case, a molten mixture of the porous active carbon material and the binder are place in a mold and cooled to solidify the binder. In the latter case, the porous active carbon material, binder, and solvent are mixed, placed into a form or mold, and the solvent removed. The binder may be any polymeric binder known for retaining the electroactive materials. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), or gelatine. In some embodiments, binders may include a co-polymer of any two or more such polymers, or a blend of any two or more such polymers.

Loading of the carbon in the binder should be sufficient to support electron transfer in the cell and provide a sufficient cell voltage. For example, the loading may be from about 0.1 $mg_{carbon}/cm^2$ to about 2 $mg_{carbon}/cm^2$. In some embodiments, the loading is from about 0.5 $mg_{carbon}/cm^2$ to about 1.5 $mg_{carbon}/cm^2$. In some embodiments, the loading is about 1.0 $mg_{carbon}/cm^2$.

The cathode may also include a gas-diffusion layer (GDL) upon which the porous active carbon material is deposited. The GDL allows for additional oxygen passage into the cell for better, and more even distribution of the oxygen throughout the cell. GDL materials may include, but are not limited to, paper and polymers.

The porous active carbon material is typically sequestered on a current collector to provide contact between the material and an external load to allow for the flow of electrons through a circuit to which the electrode is connected. The current collector may be a conductive material. Illustrative current collectors include, but are not limited to, aluminum, nickel, platinum, palladium, gold, silver, copper, iron, stainless steel, rhodium, manganese, vanadium, titanium, tungsten, or aluminum.

In lithium-air batteries, while the cathode is air (or oxygen), the anode includes lithium metal. For example, the anode may include a lithium metal foil, a lithiated metal alloy, or a composite carbon-lithiated metal alloy, where the metal is one or more of Si, Sn, Mo, or Ge.

The lithium-air batteries also include a separator between the cathode and the anode. The separator may be a porous paper, porous ceramic, or porous polymer separator. Illustrative separators include, but are not limited to, polyethylene, paper, glass, and ceramics.

The lithium-air battery may take any form as is known for such batteries. In one embodiment, the battery is a coin cell, the structure of which are well known. The cathode side of the coin cell contains a shell covering that is porous or has holes in it to allow for air penetration into the cell. While the anode side of the coin cell is a solid shell. Electrical contacts are made with the outer surface of the shell.

In another aspect, a discharged lithium-air battery is provided including a cathode that includes a porous active carbon material, a separator, an anode including lithium, an electrolyte, and a lithium peroxide exhibiting a nanostructured morphology and having a superoxide surface structure. The superoxide structures are further described below, however, it is noteworthy that the structure of the lithou peroxide having a superoxide surface structure differs from bulk lithium peroxide in electrochemical response. The lithium peroxide having a superoxide structure is composed of nanoparticles of lithium peroxide in which the particles have an average diameter of from about 1 nm to about 200 nm. This includes average particle diameters from about 1 nm to about 100 nm, and from about 1 to 70 nm. In any of the above embodiments, the form of lithium peroxide has a low charge overpotential which includes a superoxide surface structure: lithium peroxide including an oxygen-rich surface. As defined herein, an oxygen-rich surface are nanoparticle facets dominated by oxygen termination.

The electrolye for the discharged lithium battery includes an ether-based solvent. For example, any of the solvents described above by Formula I are suitable. This includes, but is not limited to, solvents such as tetraethyleneglycoldimethylether (TEGDME), diglyme, triglyme, 2-[2-[2-[2-methoxy]ethoxy]ethoxy]ethoxy trimethyl silane (1NM3), $(CH_3)_3SiO(CH_2CH_2O)_nCH_3$; $(CH_3)_3SiCH_2O(CH_2CH_2O)_nCH_3$; $CH_3O(CH_2CH_2O)_nSi(CH_3)_2O(CH_3)_2SiO(CH_2CH_2O)_nCH_3$; and $CH_3O(CH_2CH_2O)_2Si(CH_3)_2OSi(CH_3)_2O(CH_2)_2SiO(CH_2CH_2O)_2CH_3$, where each n is independently 2-7.

In any of the above embodiments, the electrolyte includes an ether-based solvent and a lithium salt. In any of the above embodiments, the electrolyte includes a compound which favors formation of lithium peroxide having a low charge overpotential. Additives are compounds that favor such lithium peroxides. For examples, the additive may include, but are not limited to, crown ethers such as, but not limited to 12-crown-4, 15-crown-5, 18-crown-6, dibenzo-18-crown-6, and diaza-18-crown-6; vinyl acetate; ethylene sulfite, propylene sulfite, dimethyl sulfite; diethyl sulfite; bromo-γ-butyrolactone, and fluoro γ-butyrolactone; and aromatic compounds, such as but not limited to biphenyl, biphenyl derivatives, and cyclohexyl benzene; and salts such as $Li[B(C_2O_4)_2]$, $Li[B(C_2O_4)F_2]$, or $Li[PF_4(C_2O_4)]$; or a mixture of any two or more such additives. The electrolyte may be a blend of one or more ethers, as illustrated above, with other solvents. For example, such other solvents may include, but are not limited to, sulfones. I The concentration of the additive in the electrolye may be from about 0.01 wt % to about 15 wt %. This includes from about 0.01 wt % to about 12 wt %, and from about 0.01 wt % to about 10 wt %. In some embodiments, the additive, or mixture of additives is added to the electrolyte up to about 6 wt %.

As mentioned above the lithium-air batteries provided herein provide for results which are very surprising. This is because the reversibility and low overcharge potential are achieved without the use of a metal catalyst in the cathode. Without being bound by theory it is believed that electrochemical reversibility of the lithium oxide requires defects in the bulk or on the surface to provide electrical conductivity since bulk lithium peroxide has a band gap of 4.8 eV. As used herein, bulk lithium peroxide is purchased as a powder from Aldrich for measurements. When bulk lithium peroxide is computed it is based on the Foppl crystal structure. The DFT density of states (i.e. majority and minority spins, further described below with respect to the examples) from the "superoxide" species for a high spin state lithium peroxide nanoparticle, indicates the presence of a finite density of states in the band gap, which would give surface electrical conductivity. Similar results are found for the (100) surface of $Li_2O_2$. Thus, electrical conductivity in a $Li_2O_2$ nanoparticle matrix may be enabled by surface effects or bulk defects sites, as well as effective connectivity through grain boundaries and interfacing with the carbon. The observed reversibility and low charge potential based on a carbon electrode without a metal catalyst is strong evidence for this conclusion. The lithium peroxide of the discharge product from lithium air wherein the nanostructured morphology is made of nanoparticles with less than 200 nm and preferably less than 100 nm and more preferably less than 70 nm. The lithium peroxide of the discharge product in a lithium air battery has a surface that is characterized by an oxygen-rich superoxide like structure.

In summary, the results presented here, provide a significant advance in solving two major challenges for Li-air batteries, namely reversibility and charging polarization. Reversible Li-air processes, with low charge overpotentials, can be achieved through the use of an ether-based electrolyte without a metal catalyst.

The present invention, thus generally described, will be understood more readily by reference to the following examples, which are provided by way of illustration and are not intended to be limiting of the present invention.

Examples

General Considerations

The lithium-air batteries used in the examples are based on two ether-based electrolytes: lithium triflate in tri(ethylene glycol)methyltrimethyl silane ($1NM3-LiCF_3SO_3$) and lithium triflate in tetra(ethylene glycol)dimethylether solvent ($TEGDME-LiCF_3SO_3$). Both electrolytes exhibit high conductivity on the order of $1.3 \times 10^{-3}$ S·cm$^{-1}$ and $9 \times 10^{-4}$ S·cm$^{-1}$, respectively. A Super P carbon (50 nm size particles) coated on a gas diffusion layer (GDL; TGP-H-030 carbon paper, available from Torray) with no added metal catalyst was used as cathode. This GDL was included to insure an efficient oxygen diffusion through the carbon cathode side. The LiO$_2$ testing was done using a coin cell. The cell discharge and charge was carried out in a time-controlled mode at various current densities for different number of hours for cycling investigations.

Figure 1:
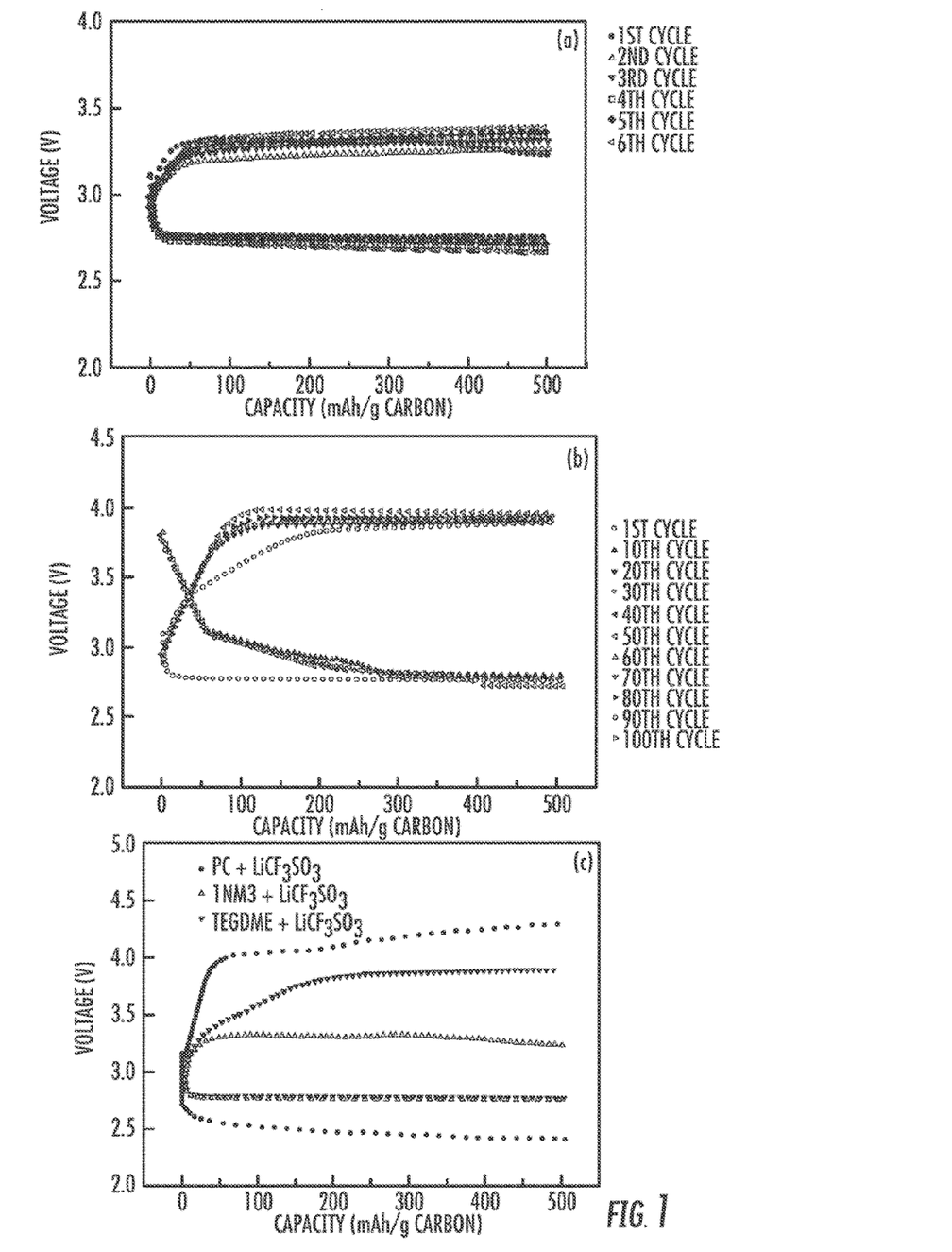

FIG. 1 shows the results for a Li-air cell using 1NM3-LiCF$_3$SO$_3$ and TEGDME-LiCF$_3$SO$_3$, with no metal catalyst. FIG. 1A illustrates a charge-discharge voltage profile for 1NM3-LiCF$_3$SO$_3$ with a current density of 100 mA/g and 5 hour time control, which indicates that the cell shows a small hysteresis between charge and discharge voltages. The stability of the cell is evidenced by the repeated cycling for 6 cycles, after which it gradually destabilizes. The stable response and the low voltage spread during repeated cycling demonstrate that the cell can operate reversibly. The results in FIG. 1B for the TEGDME-LiCF$_3$SO$_3$ electrolyte show longer cycle life (about 100 cycles) than 1NM3-LiCF$_3$SO$_3$ (both at a similar capacity), but with a charge overpotential that is about 0.5 V greater than for the 1NM3 solvent.

The results illustrated in FIG. 1 are remarkable in three respects. First, the cells based on both electrolytes exhibit excellent reversibility. This is in contrast to previous studies based on ethers that showed little reversibility. For example, see McCloskey et al. *J. Phys. Chem. Lett.* 2, 1161 (2011) and Freunberger et al. *Angew. Chem. Int. Ed.* 50, 8609 (2011). Secondly, the results illustrated in FIG. 1 show a very low charge overpotential at about 3.4 V for 1NM3-LiCF$_3$SO$_3$, which is considerably lower than previous Li-air studies based on propylene carbonate (PC), which show large charge potentials at around 4.2 V (see Girishkumar et al. *J. Phys. Chem. Lett.* 1, 2193 (2010); Ogasawara et al. *J. Am. Chem. Soc.* 128, 1390 (2006); and Mizuno et al. *Electrochem.* 78, 403 (2010), the results from which are shown in FIG. 1C) and ether-based electrolytes, which have charge potentials that rise from an initial value of about 3.4 V to over 4 V for a single cycle. Thirdly, the reversibility and low charge overpotential have been achieved with no metal catalyst added to the cathode. Such results are surprising and provide a significant advance in solving major challenges for Li-air batteries.

The excellent reversibility and charge polarization properties presented here are closely connected. For if the charging potential is too high, it will result in the decomposition of the electrolyte, and give rise to poor reversibility. The combination of both the electrolyte and carbon cathode appears to promote a uniform formation of lithium oxide that decomposes at the same charge potential after the first discharge. The direct evidence for this is that the potential stays constant at about 3.4 V with 1NM3-LiCF$_3$SO$_3$ for 6 cycles and at about 3.9 V with TEGDME-LiCF$_3$SO$_3$ for 100 cycles. These electrolytes also show outstanding cycling characteristics at higher charging rate (1000 mA/g); although with larger charge polarization effects. To develop a better understanding of the charge and discharge chemistries in these two ether-based systems that result in these charge potentials, and thus good reversibility, density functional theory (DFT) studies have been conducted.

Figure 2:
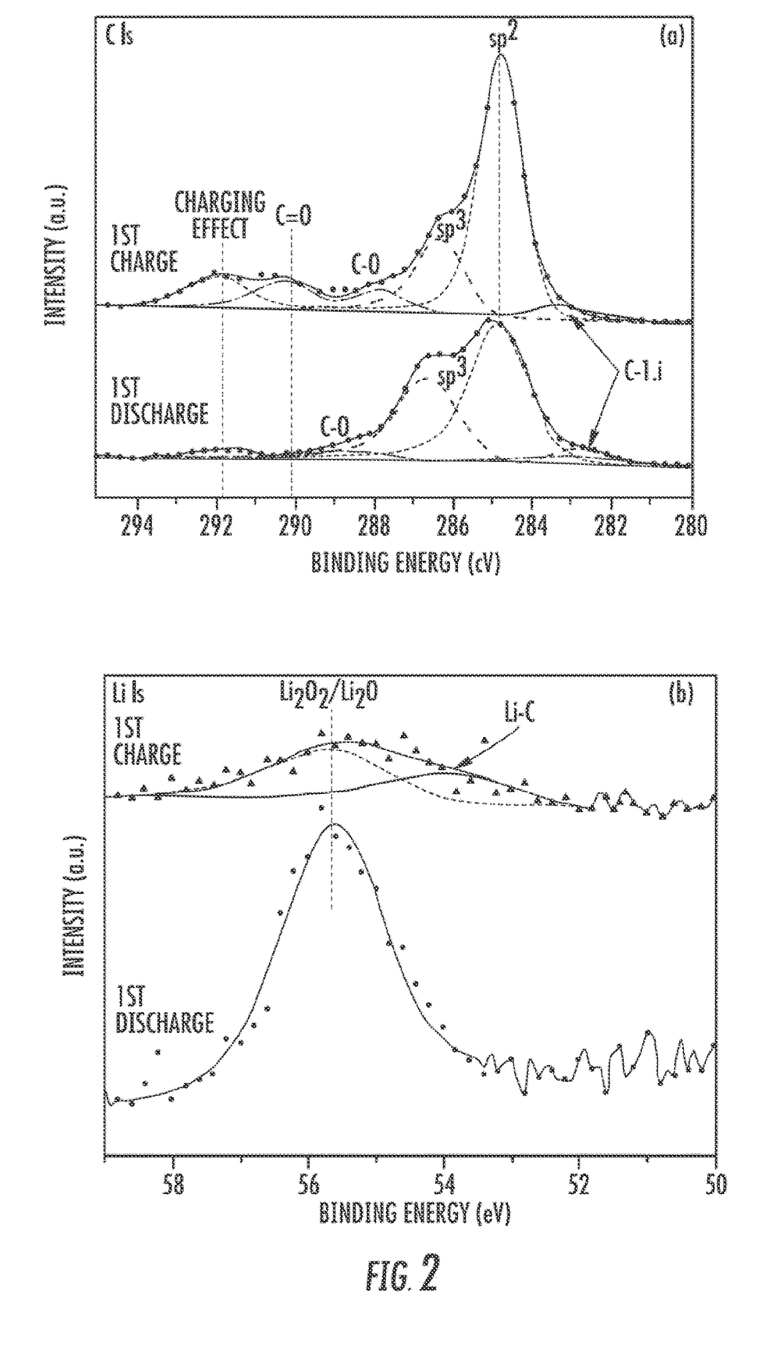
FIG. 2 is a C1s XPS spectra (a) and Li1s XPS spectra (b) of discharged and charged cathode using 1NM3-$LiCF_3SO_3$ based electrolyte. SEM images of (c) pristine carbon cathode, (d) discharged cathode using 1NM3-$LiCF_3SO_3$, (e) high magnification of discharged cathode using 1NM3-$LiCF_3SO_3$, (f) charged cathode using 1NM3-$LiCF_3SO_3$, (g) discharged cathode using TEGDME-$LiCF_3SO_3$

A detailed x-ray photoelectron spectroscopy (XPS) investigation was performed to characterize the species resulting from the electrochemical reactions taking place during discharge and charge in the Li-air cell. FIG. 2 shows the C1s and Li1s XPS data collected from the first discharge and charge samples (obtained with five hour time control) using 1NM3-LiCF$_3$SO$_3$. The main discharge products are lithium oxides based on the Li1s spectra (FIG. 2B). From the XPS data it is not possible to distinguish Li$_2$O$_2$ from Li$_2$O, however, the discharge product is identified as Li$_2$O$_2$ based on XANES data. No electrolyte decomposition products, such as Li$_2$CO$_3$ or LiOH, were detected in XANES on first discharge. XPS measurements of 1NM3 cycling also that confirm these results for subsequent cycles. The XPS Li1s data indicates that the lithium peroxide discharge product decomposes during the charging process. The XPS results for the TEGDME-LiCF$_3$SO$_3$ electrolyte on the first and subsequent cycles gives similar results as described above for 1NM3. A XANES (X-ray Absorption Near Edge Structure) investigation of the TEGDME discharge product from the first cycle also indicates the presences of Li$_2$O$_2$ and no electrolyte decomposition products. Thus, these characterization studies provide clear evidence that the lithium peroxide products formed on the discharge are decomposed during charge, indicating reversibility in both electrolytes.

Field-emission scanning electron microscopy (FESEM) was used to obtain insight into the particle sizes and morphologies of samples at different stages, as shown in FIG. 2 for the first cycle. It is clearly seen that the discharge products for the 1NM3-LiCF$_3$SO$_3$ electrolyte are deposited on the surface and in pores of the carbon electrode (FIGS. 2D and 2C) when compared to the pristine electrode (FIG. 2C). In this case, the nanoparticle size of the discharge products appears to be in the range of 30 to 70 nm. After charging, the porosity of the electrode reappears, indicating that most of the lithium peroxide has been decomposed (FIG. 2F). The SEM image after discharge is shown in FIG. 2G for the TEGDME-LiCF$_3$SO$_3$ electrolyte and indicates slightly larger nanoparticle size of around 100 nm. Similar SEM results are obtained on subsequent cycles for both 1NM3-LiCF$_3$SO$_3$ and TEGDME-LiCF$_3$SO$_3$. It is interesting to note that in addition to the different sizes, the nanoparticles have crystalline faces in the case of TEGDME, whereas such faces are not visible for the 1NM3 results. These differences in nanomorphology in the two electrolytes seem correlated with the distinct difference in the observed charge potentials (3.9 V vs. 3.4 V); this result is discussed further below. These results are different from the toroidal shape reported during the formation of lithium peroxide by others. See Mitchell et al. *Energy Environ. Sci.* 4, 2952 (2011).

Although both the XPS and SEM data provide evidence of the electrochemical reversibility of lithium peroxide formation/decomposition, it is also necessary to consider possible electrolyte decomposition during these processes. Electrolyte decomposition could occur by several mechanisms. First, during discharge there could be reactions occurring between the electrolyte and an oxygen reduction species (such as O$^{2-}$) that result in Li$_2$CO$_3$. However, the absence of any Li$_2$CO$_3$ in the XPS spectra, as well as in the XANES data, provides evidence that the ether-based electrolytes used in this work are stable with respect to decomposition. Secondly, during charge, oxidation of the electrolyte could result in decomposition. The 1NM3-LiCF$_3$SO$_3$ electrolyte has an electrochemical stability window extending to about 4.5 V vs. Li from cyclic voltammetry. Thus, this electrolyte is stable at the charge potential of 3.4 V for 1NM3-LiCF$_3$SO$_3$. The TEGDME-LiCF$_3$SO$_3$ similarly has an oxidative stability of about 4.6 V. DFT calculations suggest that 1NM3 and TEGDME are stable to decomposition by reaction with possible oxygen reduction species such as O$^{2-}$. These calculations also indicate that the two electrolytes have large barriers to possible decomposition reactions on $Li_2O_2$ surfaces, which suggests that such chemical reactions leading to $CO_2$ or $Li_2CO_3$ formation are unlikely.

Density functional theory (DFT) calculations have been carried out on nanoparticles of 16 and 54 $Li_2O_2$ units. An interesting feature from the DFT calculations is the "superoxide"-like structure protruding out of the surface with short O—O bond lengths of about 1.3-1.4 Å (as found in bulk lithium superoxide) compared to a normal O—O bond length of 1.5 Å for $Li_2O_2$ units in the nanoparticles. Surprisingly, the density functional calculations also find that these nanoparticles exist not only in low spin states, expected for bulk lithium peroxide, but also in high spin states of nearly equal thermodynamic stability. For example, the lowest energy structure for the $(Li_2O_2)_{16}$ nanoparticle has four unpaired spins, and is several tenths of an eV lower in energy than the corresponding singlet state structure. The DFT calculations further indicate that the "superoxide" feature is where the spin is located on the nanoparticle. While crystalline $Li_2O_2$ surfaces would not be expected to have "superoxide" spin surface structures because of the band gap of the bulk, DFT calculations show that, surprisingly, many do. For example, although the stoichiometric (110) surface does not have spin, five other $Li_2O_2$ crystalline faces, such as the low index (100) surface, have a superoxide spin structure.

Figure 3:
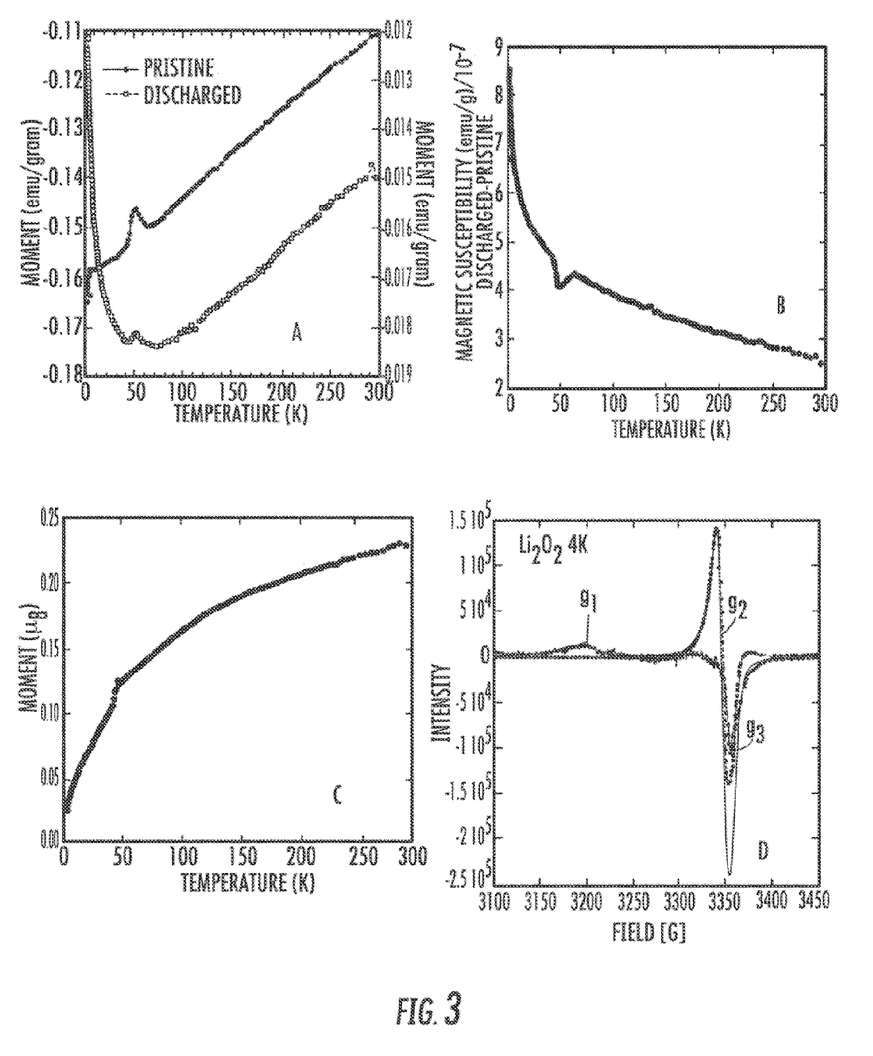
FIG. 3 illustrates the magnetic susceptibility data from SQUID measurements for (a) pristine carbon cathode before cycling and discharged cathode with 1NM3-$LiCF_3SO_3$ electrolyte, (b) difference between pristine carbon cathode and initially discharged cathode (c) Magnetic moment data from SQUID measurement for $Li_2O_2$ bulk powder. (d) EPR spectrum of $Li_2O_2$ bulk powder at 4K. The red trace is the experimental result. The blue trace is the calculated one line Lorentzian spectrum to fit the central peak at g2 value and the green trace is the difference between red and blue traces to reveal peaks at g1 and g3.

Physical measurements have been carried out that provide strong support for these theoretical predictions. Magnetic measurements using a SQUID magnetometer on the products from the first discharge cycle of 1NM3-$LiCF_3SO_3$ provide evidence for spin on the lithium peroxide that is deposited on the carbon cathode. Illustrated in FIG. 3A is a comparison of the magnetic moment of the pristine carbon cathode with that of the discharged cathode from the 1NM3-$LiCF_3SO_3$ cell. The difference plot provided in FIG. 3B shows a clear increase in paramagnetic spins. Similar results are also obtained for the discharge products in the case of TEGDME-$LiCF_3SO_3$. The observed magnetism in both cases is consistent with the presence of spins on the $Li_2O_2$ surfaces, as predicted by theory due to the "superoxide"-like structures.

Magnetic susceptibility of commercial $Li_2O_2$ powder using SQUID magnetometry (FIG. 3C) shows that it confirms the presence of spin on $Li_2O_2$ surfaces. At 2K, the magnetic moment of $Li_2O_2$ bulk is about 0.025, indicating roughly one spin per every 70 $Li_2O_2$ units. This is consistent with that observed on the discharge products and with that predicted by theory. The SQUID results are also confirmed by the EPR measurements shown in FIG. 3D that provide evidence for spins on commercial $Li_2O_2$ powder. In addition, the EPR spectra also provide evidence confirming the theoretical results that the spin is due to a "superoxide" type structure in the powder sample by comparison to the EPR spectra of $LiO_2$, although it is distinct from bulk $LiO_2$ both in its structure and a much smaller number of spins. This appears to be the first report that $Li_2O_2$ has magnetic properties and has significant implications for Li—$O_2$ discharge and charge chemistries.

The theoretical and experimental evidence for the existence of "superoxide-like" surface structures with spin on $Li_2O_2$ discharge products has important implications for understanding Li—$O_2$ charge chemistry, and more specifically for the observed reversibility and low charge potentials. Surface spin states provide the means for electronic conductivity needed for electrochemical decomposition of $Li_2O_2$. In addition, the "superoxide-like" spin structures on the nanoparticle surfaces in the $Li_2O_2$ discharge products will have a significant effect on the charge potential.

The evidence for the existence of the unanticipated "superoxide" spin structure in the discharge products, and its implications described above, provide for an understanding of why the two distinct $Li_2O_2$ nanomorphologies observed in this study are electrochemically reversible with different charge potentials, and how control of these nanomorphologies has a first-order impact on the charge properties of the Li—$O_2$ chemistry. One nanomorphology is the discharge product from the TEGDME-$LiCF_3SO_3$ electrolyte with a charge potential of 3.9 V. The nanoparticles in this discharge product appear to exhibit crystalline faces similar to the commercially purchased powder, although with smaller nanoparticle sizes (about 100 nm compared to 200-500 nm). The charge potential of about 3.9 V is also similar to that for commercial $Li_2O_2$ powder. The other nanomorphology is the discharge product from the 1NM3-$LiCF_3SO_3$ electrolyte, with what appears to be a distinctly different nanoparticle shape that is more spherical (FIG. 2C-G), and a charge potential of about 3.4 V. Based on the charge potentials, it is reasonable to assume the decomposition of nanoparticles grown in TEGDME-$LiCF_3SO_3$ is dominated by surfaces having large charge overpotentials such as from a no spin (110) $Li_2O_2$ surface, while decomposition of nanoparticles from 1NM3-$LiCF_3SO_3$ is dominated by surfaces with a lower charge overpotential such as the superoxide-like surfaces.

One possibility that must be considered before concluding that the two different nanomorphologies have different charge potentials is whether the electrolyte affects the charge potential. To investigate this possibility, commercial $Li_2O_2$ powder was charged with 1NM3 and found to exhibit a charge potential of about 4.1 V. This is clear evidence that the nature of the $Li_2O_2$ nanomorphology controls the charge potential in a Li-air cell. A similar charge potential was observed for the TEGDME electrolyte. Thus, these results confirm that it is the two differing nanomorphologies that give rise to the distinct charge potentials.

This new theoretical and experimental evidence for different forms of $Li_2O_2$ with distinct charge potentials, suggests that control of $Li_2O_2$ morphology is essential for reversibility and low charge potential of Li-air processes. A responably nanomorphology lithium peroxide has been achieved, as evidenced by cycling at low level charge potentials, through use of capacity control, use of a carbon cathode with a suitable distribution of nucleation sites, and appropriate oxygen and Li delivery to the nucleation sites. The nucleation sites are believed to be related to defect sites on the Super P used in the carbon cathode. DFT calculations also indicate that carbon defect sites are sites for lithium peroxide growth and that the spin on the defect sites decreases with nucleation of lithium peroxide on these sites. The large difference in charge potentials found for the 1NM3- and TEGDME-based electrolytes (about 0.5 V, FIG. 1) suggests that the nanomorphology of $Li_2O_2$ formed on discharge is controlled by the electrolyte environment. The 1NM3 electrolyte results in an $Li_2O_2$ nanomorphology having the spherical-like nanoparticles with a resulting lower charge potential. These results are very surprising because they are achieved without the use of a metal catalyst in the cathode.

Cell Design.

The carbon material (Super P) (80 wt %) and polyvinylidene fluoride (PVDF) (20 wt %) were slurried in a N-methyl-2-pyrrolidone (NMP) solution. The prepared slurry was then coated on a gas-diffusion layer (TGP-H-030 carbon paper, Torray) to a carbon loading density of 1.0±0.1 $Mg_{carbon}$ $cm^{-2}$. The coated electrode was subsequently dried for 12 hours at 100° C. in a vacuum to remove residual solvent. The resulting electrode was used as cathode material in lithium-air cell.

The $Li/O_2$ test cells were performed using R2032 coin type cells (see FIG. 1a-1) and were assembled in an argon-filled glove box with moisture and oxygen content of less than 0.1 ppm. The positive pans of the kits were machine-drilled 21×1.0 mm dia. holes that were evenly distributed on the pans to allow air passage. The cell consists of metallic lithium foil anode (200 μm thick) and the aforementioned carbon cathode. A glass filter (Whatman) separated the two electrodes. Solutions of $LiCF_3SO_3$ (Aldrich) in lithium tri (ethylene glycol) methyltrimethyl silane solvent (1NM3) with a concentration of 1M and in tetra (ethylene glycol) dimethyl ether solvent (TEGDME) with a concentration of 1M were used as electrolytes.

The cell was placed in an oxygen-filled chamber where oxygen pressure was maintained at slightly higher than 1 atm. The cell discharge and charge were carried out with a VMP3 Biologic-instrument. The charge-discharge test was carried out on the time-controlled mode at various current densities for different hours.

Electrochemical Measurements.

The electrochemical characteristics of the cell were investigated by galvanostatic cycling at various current regimes. The cell was placed in an oxygen-filled chamber where oxygen pressure was maintained at slightly higher than 1 atm. The cell discharge and charge were carried out with a VMP3 Biologic-instrument. The charge-discharge test was carried out on the time-controlled mode at various current densities. The stability window of the electrolyte has been detected by linear sweep voltammetry (LSV) using a lithium cell with Super P carbon electrode at a scan rate of 0.5 mV $s^{-1}$. The Super P electrode was prepared by blending the carbon powder together with the PVDF binder with 80:20 weight ratio, on Al and Cu support for the anodic and cathodic scan, respectively.

XPS Measurements.

All XPS measurements were made using a Kratos™ Axis Ultra DLD surface analysis instrument. The base pressure of the analysis chamber during these experiments was $3\times10^{-10}$ Torr, with operating pressures around $1\times10^{-9}$ Torr. Spectra were collected using a monochromatic Al Kα source (1486.7 eV) and a 300×700 micron spot size. The Al source was operated at 12 mA of emission current with the target anode set to 15 kV, for a resulting power of 180 W. For survey spectra the data were collected using a pass energy of 160 eV (fixed analyzer transmission mode), a step size of 1 eV and a dwell time of 200 ms. High resolution regional spectra were collected using a pass energy of 40 eV (fixed analyzer transmission mode), a step size of 0.1 eV and a dwell time of 300 ms. For low signal to noise regions, multiple passes were made and the results averaged together as noted.

Prior to introduction into the load lock vacuum chamber of the instrument, all air sensitive samples were loaded into an inert transfer module which interfaces with the instrument. Samples were prepared for analysis in an Ar-filled glove box, with no more than 1 ppm $O_2$ and 1 ppm $H_2O$. Non-conductive samples showed evidence of differential charging, resulting in peak shifts and broadening. Photo-electron peak positions were shifted back towards their true values and their peak widths were minimized by flooding the samples with low-energy electrons and ions from the charge neutralizer system on the instrument. Further peak position correction was made by referencing the C 1s peak position of adventitious carbon for a respective sample (284.8 eV, PHI Handbook), and shifting all other peaks in the spectrum accordingly.

Fitting was done using the program called Casa XPS. Each relevant spectrum was fit to a Shirley type background to correct for the rising edge of backscattered electrons that shifts the baseline higher at high binding energies. Peaks were fit as asymmetric Guassian/Lorentzians, with 0-30% Lorentzian character. The FWHM of all sub-peaks were constrained to 0.7-2 eV, as dictated by instrumental parameters, lifetime broadening factors, and broadening due to sample charging. With this native resolution set, peaks were added and the best fit, using a least squares type fitting routine, was obtained while adhering to the constraints mentioned above.

SEM Measurements.

A field-emission scanning electron microscope (FEI Quanta 600 FEG)) coupled with Energy Dispersive Spectrometry (EDS) was employed to observe the morphology and estimate the particle size of the samples after discharge and charge. The samples were protected from exposure to air during the transfer to the SEM sample chamber by a conductive tape applied in the glove box.

Magnetic Susceptibility Measurements (SQUID).

The variable-temperature dc magnetic susceptibility were measured on a Quantum Design MPMS-7XL SQUID magnetometer equipped with a 70000 Oe superconducting magnet. Powder samples of the pristine electrode material (3.063 mg), the discharged cathode (16.558 mg), and bulk $Li_2O_2$ (57.064 mg) were loaded into gelatin capsules in a dry box. The samples were cooled in zero-field to the lowest achievable temperature of 2 K, the magnet was charged to 20000 Oe and data collected on warming to 300 K. The magnetization of an empty gelatin capsule was measured under identical conditions. For each case, the background signal resulting from the gelatin capsule was subtracted from the sample magnetization. The magnetic moment for the pristine and discharged material was converted to a per-gram value. The magnetic contribution from the discharged material was obtained by subtracting these two data sets on a point-by-point basis assuming 18% contribution from the pristine carbon. The majority of these spins are expected to be from the nanostructured $Li_2O_2$. Diamagnetic correction was not made, as the composition is expected to be a complex mixture of carbon, electrolyte, and lithium peroxide.

EPR Measurements.

The EPR measurements on bulk $Li_2O_2$ (Sigma-Aldrich) were performed with the use of an IBM-Bruker ER-200 X-band spectrometer with a $TE_{102}$ rectangular cavity. Low temperature experiments (4-295 K) were carried out with the use of an Oxford 900 flow-through cryostat and an ITC4 Intelligent Temperature Controller. A strong-pitch standard (g=2.0028) was used for g value calibration. DPPH (2,2-Di (4-tert-octylphenyl)-1-picrylhydrazyl, Aldrich) that contains one free radical per molecule was used for spin count standard.

Computational Methods.

$(Li_2O_2)_{54}$ Nanoparticle.

The $(Li_2O_2)_{54}$ nanoparticle (216 atoms) was examined using density functional theory based on plane wave basis functions as implemented in the Vienna ab initio simulation package (VASP). Non-spin-polarized and spin-polarized calculations were carried out using the generalized gradient approximation (GGA) within the implementation of Perdew, Burke, and Ernzerhof (PBE). See Perdew et al. *Phys. Rev.*

Lett. 77, 3865 (1996). The projector augmented wave (PAW; see Blöchl, *Phys. Rev. B* 50, 17953 (1994)) method was used to represent the interaction between the core electrons and valence electrons, and the Kohn-Sham valence states (1s2s2p for Li, 2s2p for O) are expanded in plane wave basis sets up to a kinetic energy cutoff of 400 eV. The $(Li_2O_2)_{16}$ system is computed in 30×30×30 Å$^3$ simulation cells. The convergence criterion of the total energy was set to be within $1\times10^{-5}$ eV within the Γ-point integration, and all the geometries were optimized until the residual forces became less than $1\times10^{-2}$ eV/Å.

$(Li_2O_2)_6$ Nanoparticle.

The calculations on $(Li_2O_2)_{16}$ were performed using the real space grid-based code GPAW (see Mortensen et al. *Physical Review B* 71, 035109 (2005) and Enkovaara et al. *Journal of Physics Condensed Matter* 25, 253202 (2010)) which is based on the projector augmented wave (PAW) method. Initially, the geometry was obtained from classical molecular dynamics simulation that performed using the Buckingham-type interatomic potentials that implemented in DL_POLY code (see Smith et al. *Journal of Molecular Graphics* 14, 136 (1996)). Then the selected geometry was further relaxed using GPAW. All the calculations are non-polarized and performed using the PBE exchange correlation functional. To reduce the image-image interaction we used a 45×45×45 Å$^3$ cell with about 25 Å vacuum between the clusters. All calculations are sampled with a single K-point grid and the grid spacing of 0.18 Å. The geometry was optimized until the residual forces became less than 0.05 eV/Å. Based on the relaxed geometry of GPAW, the different electronic state properties were then analyzed using spin-polarized calculations as implemented in VASP code.

$Li_2O_2$ Surfaces.

All the low index $Li_2O_2$ surfaces were studied based on plane wave basis functions as implemented in the VASP code. All the calculations were spin-polarized and carried out using the PBE exchange-correlation functional under the projector augmented wave (PAW) method, with plane wave basis sets up to a kinetic energy cutoff of 400 eV. The supercell technique was used to keep the surface slab separated by about 18 Å vacuum layers. We used a (3×3×1) and (6×6×1) Monkhorst-Pack K-point grids for the (110) and (100) surfaces, respectively. The convergence criterion of the total energy was set to be within $1\times10^{-5}$ eV within the Γ-point integration, and all the geometries were optimized until the residual forces became less than $1\times10^{-2}$ eV/Å.

Figure 4:
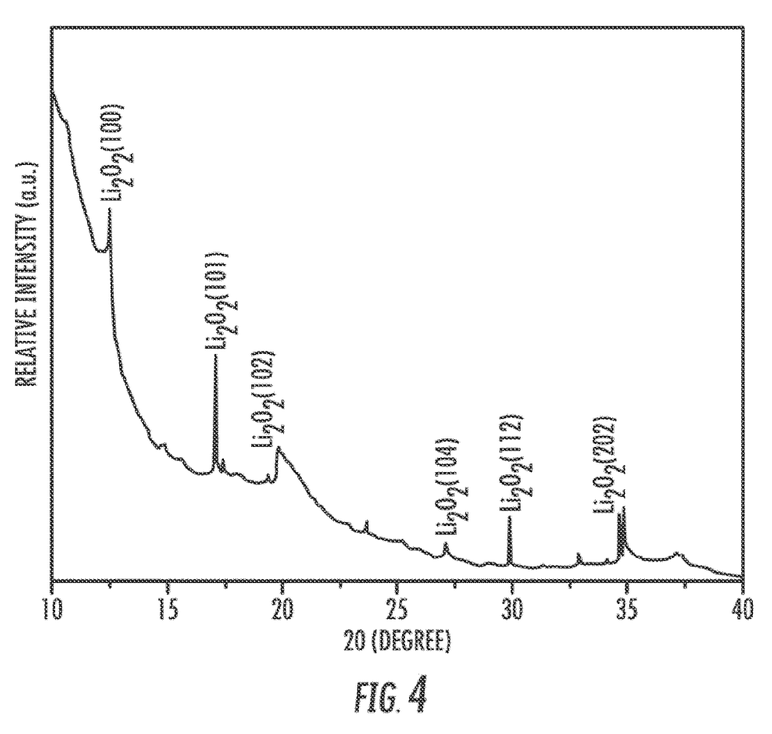
FIG. 4. illustrates the high-resolution XRD patterns of discharged products in a Li-air cell, according to the examples.

XRD results. The structures of discharged products were identified by using synchrotron X-ray diffraction (XRD), which was carried out at the beamline 11-IDD at Advanced Photon Source (APS) of Argonne National Laboratory. The sample is in a cell configuration with lithium metal, electrolytes and carbon cathode. The X-ray wavelength was fixed to 0.741918 Å. The XRD patterns were collected in the transmission mode using a Pilatus 2M detector. The collected 2D patterns were then integrated into conventional 1D patterns (intensity vs. 2Θ) for final data analysis using the Fit2d software. FIG. 4 illustrates the high-resolution XRD patterns of discharged products in a Li-air cell. $Li_2O_2$ is clearly shown as the main discharge product. Other peaks may be attributed to Li metal and the carbon support.

EPR Results.

In order to characterize $Li_2O_2$, we carried out EPR measurements on the bulk sample. According to simple octet rule, $Li_2O_2$ is not expected to give any EPR signal. The spectrum at room temperature is indeed barely recognizable, however, below 100 K, a fairly well defined EPR signal is observed. The spectrum at 4 K is shown in FIG. 3D. The g-value anisotropy ($g_1$, $g_2$, and $g_3$ at 2.0966, 2.0049, and 1.9993, respectively) is reminiscent of the matrix-isolated lithium superoxide, $LiO_2$. The differences in the g-values in $Li_2O_2$ show larger anisotropy, much broader line width, and no well resolved hyper fine couplings. It has a much lower spin count than $LiO_2$, although it has not been fully quantified at the present time. The observation of $Li_2O_2$ EPR signal at low temperature is consistent with the theoretical results of the presence of "superoxide like" structure. The broad line width and no well resolved hyper fine couplings are also in good agreement of a few possible superoxide-like structures with variation of Li—$O_2$ local geometry.

The super-P carbon electrode was also studied after full discharge in order to detect the spin on the $Li_2O_2$. The EPR spectra at room temperature and 4 K primarily belong to the signal from graphitic carbon.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A lithium-air battery comprising a cathode comprising a porous active carbon material, a separator, an anode comprising lithium, and an electrolyte comprising a lithium salt and polyalkylene glycol ether, wherein the porous active carbon material is free of a metal-based catalyst.

2. The lithium-air battery of claim 1, wherein the porous active carbon material is free of any metal species except for lithium species.

3. The lithium-air battery of claim 1, wherein the polyalkylene glycol ether is a compound represented by Formula I:

$$R^1O\{[(CR^2R^3)_xO]_z\}R^4 \qquad (I)$$

wherein:
R$^1$ is alkyl, aryl, heterocyclyl, heteroaryl, siloxyl or silyl;
each occurrence of R$^2$ and R$^3$ is independently H, halo, alkyl, aryl, heterocyclyl, heteroaryl, silyl, or siloxyl;
R$^4$ is alkyl, aryl, heterocyclyl, heteroaryl, siloxyl or silyl;
x is 1, 2, 3, 4, 5, or 6; and
z is 2, 3, 4, 5, 6, 7, or 8.

4. The lithium-air battery of claim 3, wherein R$^1$ is alkyl, cycloalkyl, heterocyclyl, or silyl.

5. The lithium-air battery of claim 3, wherein x is 1, 2, or 3, and z is 2, 3, or 4.

6. The lithium-air battery of claim 3, wherein R$^1$ is C$_1$-C$_8$ alkyl, a 5- or 6-membered cycloalkyl, a 5- or 6-membered heterocyclyl, or a trialkylsilyl; each occurrence of R$^2$ and R$^3$ are individually H, F, Cl, or C$_1$-C$_6$ alkyl; R$^4$ is C$_1$-C$_8$ alkyl, a 5- or 6-membered cycloalkyl, a 5- or 6-membered heterocyclyl, or a trialkylsilyl; x is 2, or 3; and z is 2, 3, or 4.

7. The lithium-air battery of claim 3, wherein R$^1$ is methyl, ethyl, n-propyl, iso-propyl, n-butyl, iso-butyl, tert-butyl, trimethylsilyl, or triethylsilyl; each occurrence of R$^2$ and R$^3$ is H, F, Cl, methyl, or ethyl; R$^4$ is methyl, ethyl, n-propyl, iso-propyl, n-butyl, iso-butyl, tert-butyl, a cyclic carbonate, trimethylsilyl, or triethylsilyl; x is 2, or 3; and z is 2, 3, or 4.

8. The lithium-air battery of claim 3, wherein the compound represented by Formula I is tetraethyleneglycoldimethylether, 2-[2-[2-[2-methoxy]ethoxy]ethoxy]ethoxy trimethyl silane (1NM3), or a mixture thereof.

9. The lithium-air battery of claim 3, wherein the lithium salt comprises LiCF$_3$SO$_3$, Li[B(C$_2$O$_4$)$_2$], Li[B(C$_2$O$_4$)F$_2$], or Li[PF$_4$(C$_2$O$_4$)].

10. The lithium-air battery of claim 1, wherein the porous active carbon material is free of a metal-based catalyst comprising Pt, Pd, Fe, Ti, Zr, Zn, Ag, Au, Ni, Co, Mn, Ce or La.

11. The lithium-air battery of claim 1, wherein the porous active carbon material comprises microporous carbon, mesoporous carbon, mesoporous microbeads, graphite, expandable graphite, carbon black, or carbon nanotubes.

12. The lithium-air battery of claim 1, wherein the cathode further comprises a binder.

13. The lithium-air battery of claim 1, wherein the cathode further comprises a gas diffusion layer.

14. The lithium-air battery of claim 1, wherein the separator comprises a paper or polymer separator.

15. The lithium-air battery of claim 1, wherein the anode comprises a lithium metal foil.

* * * * *